US011449192B2

(12) United States Patent
Leppänen et al.

(10) Patent No.: US 11,449,192 B2
(45) Date of Patent: Sep. 20, 2022

(54) APPARATUS, METHOD, COMPUTER PROGRAM FOR ENABLING ACCESS TO MEDIATED REALITY CONTENT BY A REMOTE USER

(71) Applicant: Nokia Technologies Oy, Espoo (FI)

(72) Inventors: Jussi Leppänen, Tampere (FI); Arto Lehtiniemi, Lempäälä (FI); Miikka Vilermo, Siuro (FI); Sujeet Shyamsundar Mate, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/261,291

(22) PCT Filed: Jul. 12, 2019

(86) PCT No.: PCT/EP2019/068826
§ 371 (c)(1),
(2) Date: Jan. 19, 2021

(87) PCT Pub. No.: WO2020/020668
PCT Pub. Date: Jan. 30, 2020

(65) Prior Publication Data
US 2021/0263636 A1 Aug. 26, 2021

(30) Foreign Application Priority Data
Jul. 25, 2018 (EP) .................................. 18185380

(51) Int. Cl.
*G06F 3/04815* (2022.01)
*G06F 3/01* (2006.01)
*G06F 3/0482* (2013.01)

(52) U.S. Cl.
CPC .......... *G06F 3/04815* (2013.01); *G06F 3/011* (2013.01); *G06F 3/0482* (2013.01)

(58) Field of Classification Search
CPC ..... G06F 3/04815; G06F 3/011; G06F 3/0482
See application file for complete search history.

(56) References Cited

U.S. PATENT DOCUMENTS 7,311,608 B1 * 12/2007 Danieli .................. A63F 13/12
463/42
9,041,739 B2 * 5/2015 Latta ....................... A63F 13/48
345/633

(Continued)

FOREIGN PATENT DOCUMENTS

EP 3128413 A1 2/2017
EP 3506661 A1 7/2019

OTHER PUBLICATIONS

Relaxation Virtual Reality Experience | Guided Meditation VR Gameplay (HTC Vive VR), retrieved via https://www.youtube.com/watch?v=qYBXu8qXj8g, Oct. 8, 2016, 6 pages (Year: 2016).*

Imre Cikajlo, Ursa Cizman Staba, Suzana Vrhovac, Frances Larkin, Mark Roddy, A Cloud-Based Virtual Reality App for a Novel Telemindfulness Service: Rationale, Design and Feasibility Evaluation, Jun. 5, 2017, retrieved via https://www.ncbi.nlm.nih.gov/pmc/articles/PMC5476869/?report=printable, 28 pages (Year: 2017).*

(Continued)

*Primary Examiner* — Yongjia Pan
(74) *Attorney, Agent, or Firm* — Harrington & Smith

(57) ABSTRACT

An apparatus comprising a man machine interface configured to provide: a screen that presents information indicative of, at least, a real-time capability of a remote user to access and consume mediated reality content; and a user-selectable option to initiate an action that causes the mediated reality content to become accessible to the remote user.

20 Claims, 14 Drawing Sheets

(56) References Cited

U.S. PATENT DOCUMENTS

| | | | | |
|---|---|---|---|---|
| 9,298,283 | B1* | 3/2016 | Lin | G06F 3/147 |
| 9,311,742 | B1* | 4/2016 | Glover | G06T 13/00 |
| 10,445,925 | B2* | 10/2019 | Tokubo | A63F 13/56 |
| 2009/0141023 | A1* | 6/2009 | Shuster | G06T 3/40 |
| | | | | 345/419 |
| 2010/0060632 | A1* | 3/2010 | Lefevre | G06T 1/0007 |
| | | | | 345/419 |
| 2014/0125698 | A1* | 5/2014 | Latta | A63F 13/5255 |
| | | | | 345/633 |
| 2015/0213650 | A1* | 7/2015 | Barzuza | H04N 13/332 |
| | | | | 348/14.07 |
| 2015/0262029 | A1* | 9/2015 | Pirchheim | G06T 3/00 |
| | | | | 382/103 |
| 2015/0283460 | A1* | 10/2015 | Huang | G06F 3/0346 |
| | | | | 345/158 |
| 2015/0317832 | A1* | 11/2015 | Ebstyne | G02B 27/017 |
| | | | | 345/633 |
| 2016/0093108 | A1* | 3/2016 | Mao | A63F 13/825 |
| | | | | 345/633 |
| 2017/0078447 | A1* | 3/2017 | Hancock | G06F 1/3215 |
| 2017/0243403 | A1* | 8/2017 | Daniels | G06T 19/20 |
| 2017/0354875 | A1* | 12/2017 | Marks | A63F 13/25 |
| 2018/0096519 | A1* | 4/2018 | Tokubo | A63F 13/211 |
| 2018/0114364 | A1* | 4/2018 | McPhee | G06F 3/038 |
| 2019/0324541 | A1* | 10/2019 | Rihn | G06F 3/04815 |
| 2020/0169754 | A1* | 5/2020 | Wang | H04N 13/371 |
| 2021/0176446 | A1* | 6/2021 | Oh | H04N 21/816 |

OTHER PUBLICATIONS

Does sitting mode (no room scale) disable head movement?, Dec. 11, 2017, retrieved via https://www.reddit.com/r/WindowsMR/comments/7j6c74/does_sitting_mode_no_room_scale_disable_head/, 2 pages (Year: 2017).*

"3rd Generation Partnership Project; Technical Specification Group Services and System Aspects; Codec for Enhanced Voice Services (EVS); General Overview (Release 14)", 3GPP TS 26.441 V14.0.0, Mar. 2017, pp. 1-12.

Extended European Search Report received for corresponding European Patent Application No. 18185380.5, dated Jan. 30, 2019, 10 pages.

"Skype for Business", Heriot-Watt, Retrieved on Jan. 17, 2019, Webpage available at : https://www.hw.ac.uk/services/docs/Skype_for_Business_user_guide_v1.1.pdf.

Sra et al., "Bringing Real Objects, Spaces, Actions, and Interactions Into Social VR", IEEE Third VR International Workshop on Collaborative Virtual Environments (3DCVE), Mar. 2016, pp. 16-17.

International Search Report and Written Opinion received for corresponding Patent Cooperation Treaty Application No. PCT/EP2019/068826, dated Oct. 8, 2019, 15 pages.

Orts-Escolano, Sergio, et al., "Holoportation: Virtual 3D Teleportation in Real-time", User Interface Software and Technology, ACM, Oct. 16, 2016, pp. 741-754.

* cited by examiner

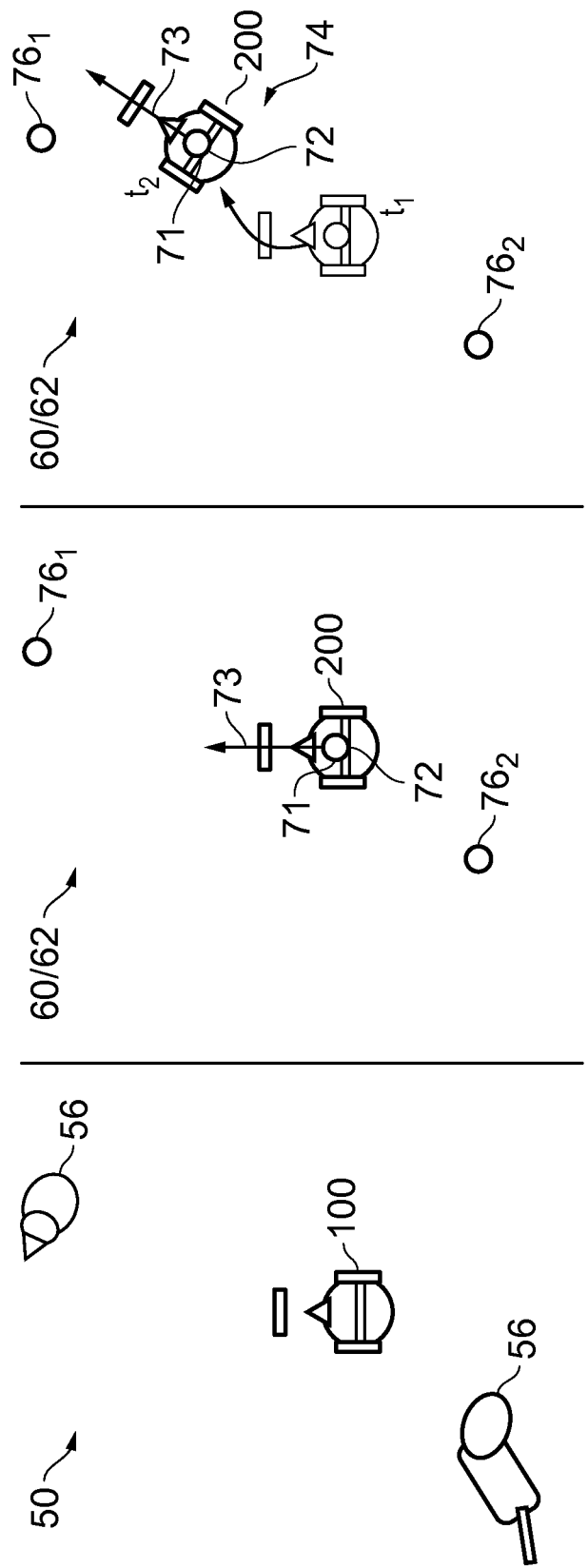

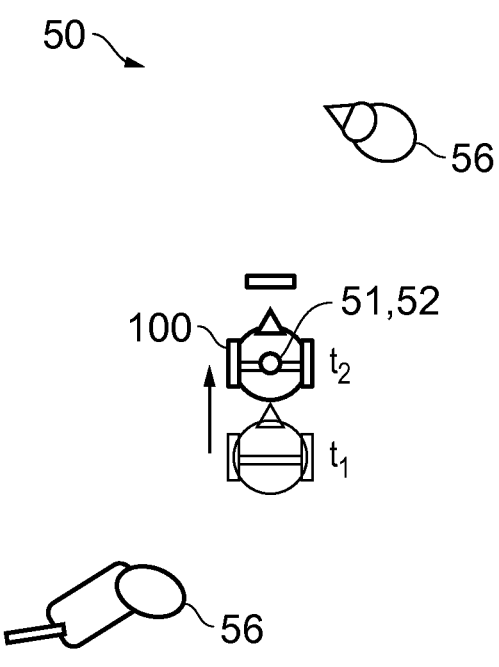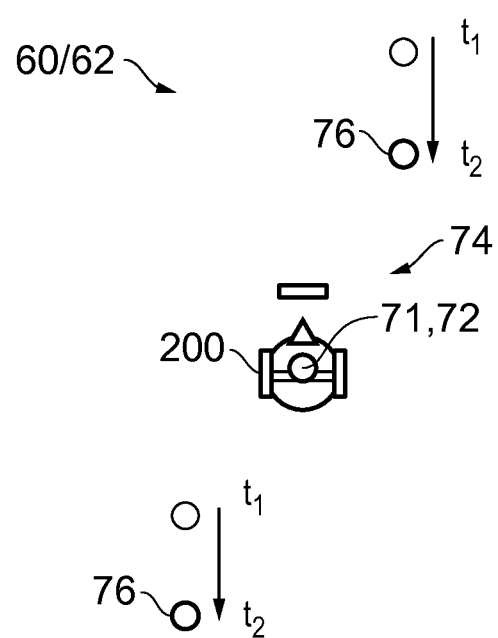
FIG. 9A                    FIG. 9B

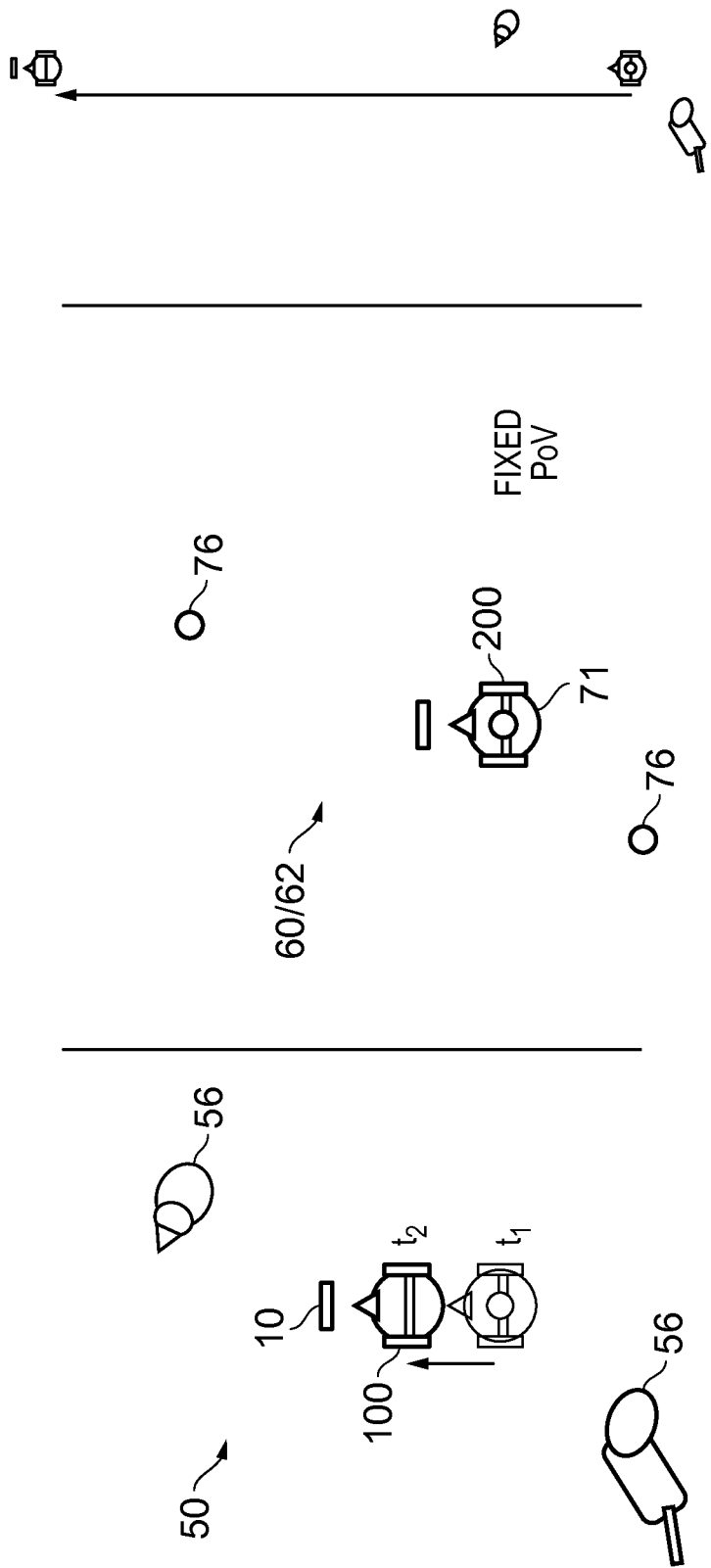

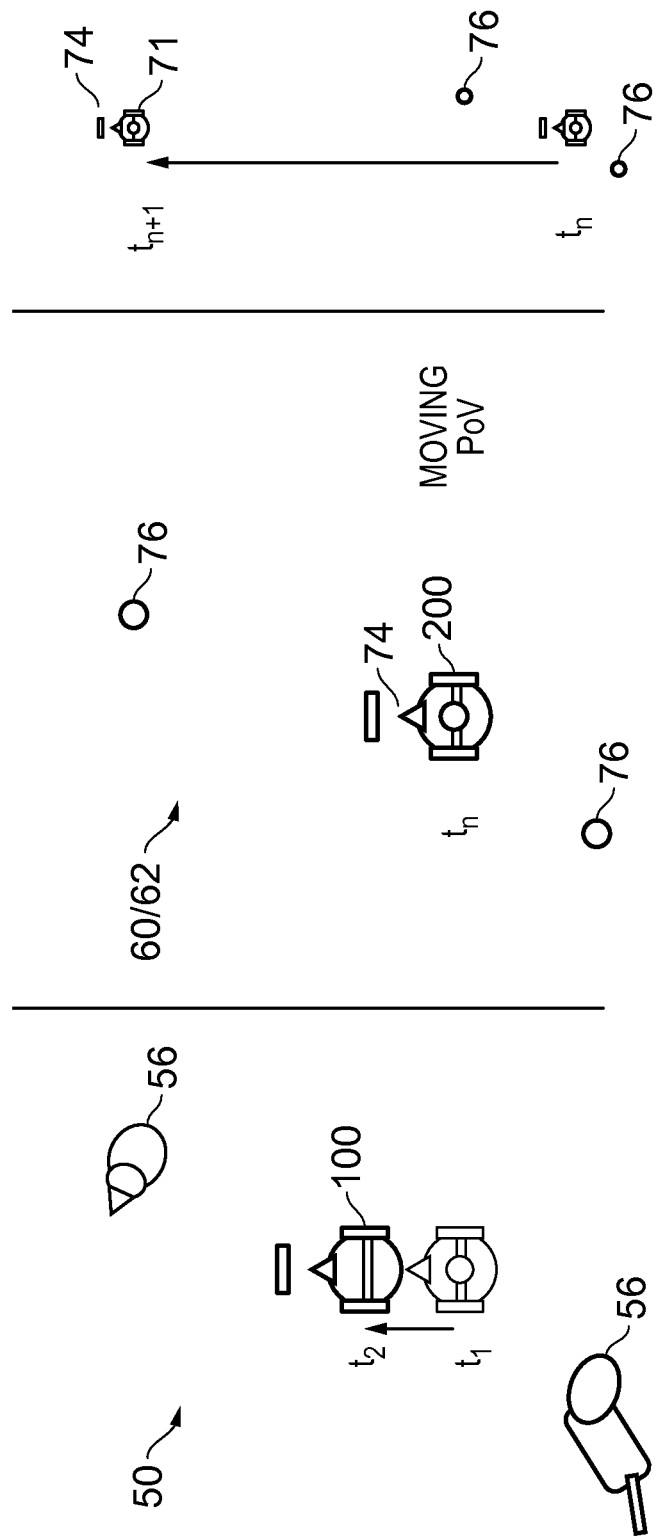

APPARATUS, METHOD, COMPUTER PROGRAM FOR ENABLING ACCESS TO MEDIATED REALITY CONTENT BY A REMOTE USER

RELATED APPLICATION

This application claims priority to PCT Application No. PCT/EP2019/068826, filed on Jul. 12, 2019, which claims priority to EP Application No. 18185380.5, filed on Jul. 25, 2018, each of which is incorporated herein by reference in its entirety.

TECHNOLOGICAL FIELD

Embodiments of the present disclosure relate to enabling access to mediated reality content by a remote user.

BACKGROUND

When mediated reality is rendered to a user the user experiences, for example visually, a fully or partially artificial environment as a virtual scene at least partially rendered by an apparatus to a user. The virtual scene is determined by a point of view of a virtual user within a virtual space.

Augmented reality is a form of mediated reality in which a user experiences a partially artificial environment as a virtual scene comprising a real scene, for example a real visual scene, of a physical real environment supplemented by one or more visual or audio elements rendered by an apparatus to a user. The term augmented reality implies a mixed reality or hybrid reality. Virtual reality is a form of mediated reality in which a user experiences a fully artificial environment as a virtual scene displayed by an apparatus to a user.

First person perspective-mediated, as applied to mediated reality means that the user's real point of view (location and/or orientation) determines the point of view (location and/or orientation) within the virtual space of a virtual user.

Three degrees of freedom (3DoF) describes mediated reality where the virtual position is determined by orientation only (e.g. the three degrees of three-dimensional orientation). In relation to first person perspective-mediated reality, only the user's orientation determines the virtual position.

Six degrees of freedom (6DoF) describes mediated reality where the virtual position is determined by both orientation (e.g. the three degrees of three-dimensional orientation) and location (e.g. the three degrees of three-dimensional location). In relation to first person perspective-mediated reality, both the user's orientation and the user's location in the real space determine the virtual position.

Three degrees of freedom 'plus' (3DoF+) describes an example of six degrees of freedom where a change in location (e.g. the three degrees of three-dimensional location) is a change in location relative to the user that can arise from a postural change of a user's head and/or body and does not involve a translation of the user through real space by, for example, walking.

BRIEF SUMMARY

According to various, but not necessarily all, embodiments there is provided an apparatus comprising a man machine interface configured to provide:

a screen that presents information indicative of, at least, a real-time capability of a remote user to access and consume mediated reality content; and a user-selectable option to initiate an action that causes the mediated reality content to become accessible to the remote user.

In some but not necessarily all examples, the real-time capability of the remote user is a capability to identify, as they happen, changes made by the remote user, in viewing direction of the remote user and viewing location of the remote user, intended by the remote user for controlling a point of view of a virtual user that defines what scene from the mediated reality content is rendered to the remote user.

In some but not necessarily all examples, the screen of the man machine interface is configured to present information indicative of, at least, a real-time capability of the remote user to access and consume mediated reality content in a first mode or a second mode, wherein, in the first mode, a point of view of a virtual user is dependent upon an orientation of a viewing direction of the remote user and is not dependent upon a change in viewing location of the remote user and, in the second mode, the point of view of the virtual user is dependent upon an orientation of a viewing direction of the remote user and is also dependent upon a change in viewing location of the remote user, wherein a point of view of a virtual user controls which scene of mediated reality content is rendered to the remote user. In the first mode, a viewing direction of the remote user may be mapped to a viewing direction of the virtual user and, in the second mode, a viewing direction of the remote user may be mapped to a viewing direction of the virtual user and a change in viewing location of the remote user may be mapped to a change in viewing location of the virtual user. Movement of the remote user may be used to trigger a switch between the first mode and the second mode, and a switch between the first mode and the second mode may be indicated to the remote user.

In some but not necessarily all examples, the real-time capability of a remote user to access and consume mediated reality content is determined, at least in part, by comparing a first movement parameter that is dependent upon movement of the remote user with a threshold. The threshold may be dependent upon spatial characteristics of the mediated reality content.

In some but not necessarily all examples, the apparatus is configured to provide spatial characteristics of the mediated reality content for determining a real-time capability of the remote user to access and consume the mediated reality content.

The apparatus is configured to provide the mediated reality content to an apparatus used by the remote user.

In some but not necessarily all examples, the user-selectable option to initiate an action that causes the mediated reality content to become accessible to the remote user is an option to initiate a live communication session between the user and at least the remote user. In some but not necessarily all of these examples, when first mediated reality content is provided by the user to the remote user live and, simultaneously second mediated reality content is provided by the remote user to the first user live, wherein a point of view of a first virtual user controls in real time which scene of the first mediated reality content is rendered to the remote user, the point of view of the first virtual user being dependent upon an orientation of a viewing direction of the remote user and, optionally, dependent upon a change in viewing location of the remote user, wherein a point of view of a second virtual user controls in real time which scene of the second mediated reality content is rendered to the user, the point of view of the second virtual user being dependent upon an orientation of a viewing direction of the user and, optionally, dependent upon a change in viewing location of the user.

In some but not necessarily all examples, the screen of the man machine interface is configured to present information indicative, for each of a plurality of remote users, a real-time capability of each of the plurality of remote users to access and consume mediated reality content; and provide a user-selectable option to initiate an action that causes the mediated reality content to become accessible to one or more of the plurality of remote users.

In some but not necessarily all examples, a personal, hand held device comprises a display and is configured as or houses the apparatus.

According to various, but not necessarily all, embodiments there is provided a method comprising: providing, via a man machine interface, a screen that presents information indicative of, at least, a real-time capability of a remote user to access and consume mediated reality content; and providing, via the man machine interface, a user-selectable option to initiate an action that causes the mediated reality content to become accessible to the remote user.

According to various, but not necessarily all, embodiments there is provided a computer program that when run on one or more processors, enables: a man machine interface screen that presents information indicative of, at least, a real-time capability of a remote user to access and consume mediated reality content; and a user-selectable option within the man machine interface to initiate an action that causes the mediated reality content to become accessible to the remote user.

According to various, but not necessarily all, embodiments there is provided an apparatus comprising means for: providing, via a man machine interface, a screen that presents information indicative of, at least, a real-time capability of a remote user to access and consume mediated reality content; and providing, via the man machine interface, a user-selectable option to initiate an action that causes the mediated reality content to become accessible to the remote user.

According to various, but not necessarily all, embodiments there is provided an apparatus comprising:
at least one processor; and
at least one memory including computer program code
the at least one memory and the computer program code configured to, with the at least one processor, cause the apparatus at least to perform . . . .
providing, via a man machine interface, a screen that presents information indicative of, at least, a real-time capability of a remote user to access and consume mediated reality content; and
providing, via the man machine interface, a user-selectable option to initiate an action that causes the mediated reality content to become accessible to the remote user.

According to various, but not necessarily all, embodiments there is provided an apparatus comprising a man machine interface configured to provide:
a screen that presents information indicative of, at least, a real-time capability of a remote user in relation to mediated reality content; and
a user-selectable option to initiate an action that causes mediated reality content to be transferred between the apparatus and the remote user.

According to various, but not necessarily all, embodiments there is provided an apparatus comprising means for:
causing mediated reality content to become accessible to a remote user wherein a point of view of a virtual user controls which scene of mediated reality content is rendered to the remote user and wherein, in a first mode, a point of view of a virtual user is dependent upon an orientation of a viewing direction of the remote user and is not dependent upon a change in viewing location of the remote user and, in a second mode, the point of view of the virtual user is dependent upon an orientation of a viewing direction of the remote user and is also dependent upon a change in viewing location of the remote user;
controlling accessibility of mediated reality content to the remote user by switching between the first mode and the second mode in dependence upon movement of the remote user.

In some but not necessarily all examples, a switch between the first mode and the second mode is indicated to the remote user. A switch between the first mode and the second mode may be indicated using audio to the remote user.

In some but not necessarily all examples, the apparatus comprises means for comparing a first movement parameter that is dependent upon movement of the remote user with a threshold. The threshold may be dependent upon spatial characteristics of the mediated reality content.

According to various, but not necessarily all, embodiments there is provided a method comprising:
causing mediated reality content to become accessible to a remote user wherein a point of view of a virtual user controls which scene of mediated reality content is rendered to the remote user and wherein, in a first mode, a point of view of a virtual user is dependent upon an orientation of a viewing direction of the remote user and is not dependent upon a change in viewing location of the remote user and, in a second mode, the point of view of the virtual user is dependent upon an orientation of a viewing direction of the remote user and is also dependent upon a change in viewing location of the remote user;
controlling accessibility of mediated reality content to the remote user by switching between the first mode and the second mode in dependence upon movement of the remote user.

According to various, but not necessarily all, embodiments there is provided examples as claimed in the appended claims.

BRIEF DESCRIPTION

Some example embodiments will now be described with reference to the accompanying drawings in which:

FIGS. 7A, 7B, 7C show an example embodiment of the subject matter described herein;

FIGS. 9A, 9B show an example embodiment of the subject matter described herein;

FIGS. 10A, 10B, 10C show another example embodiment of the subject matter described herein;

FIGS. 11A, 11B, 11C show an example embodiment of the subject matter described herein;

DEFINITIONS

Figure 1:
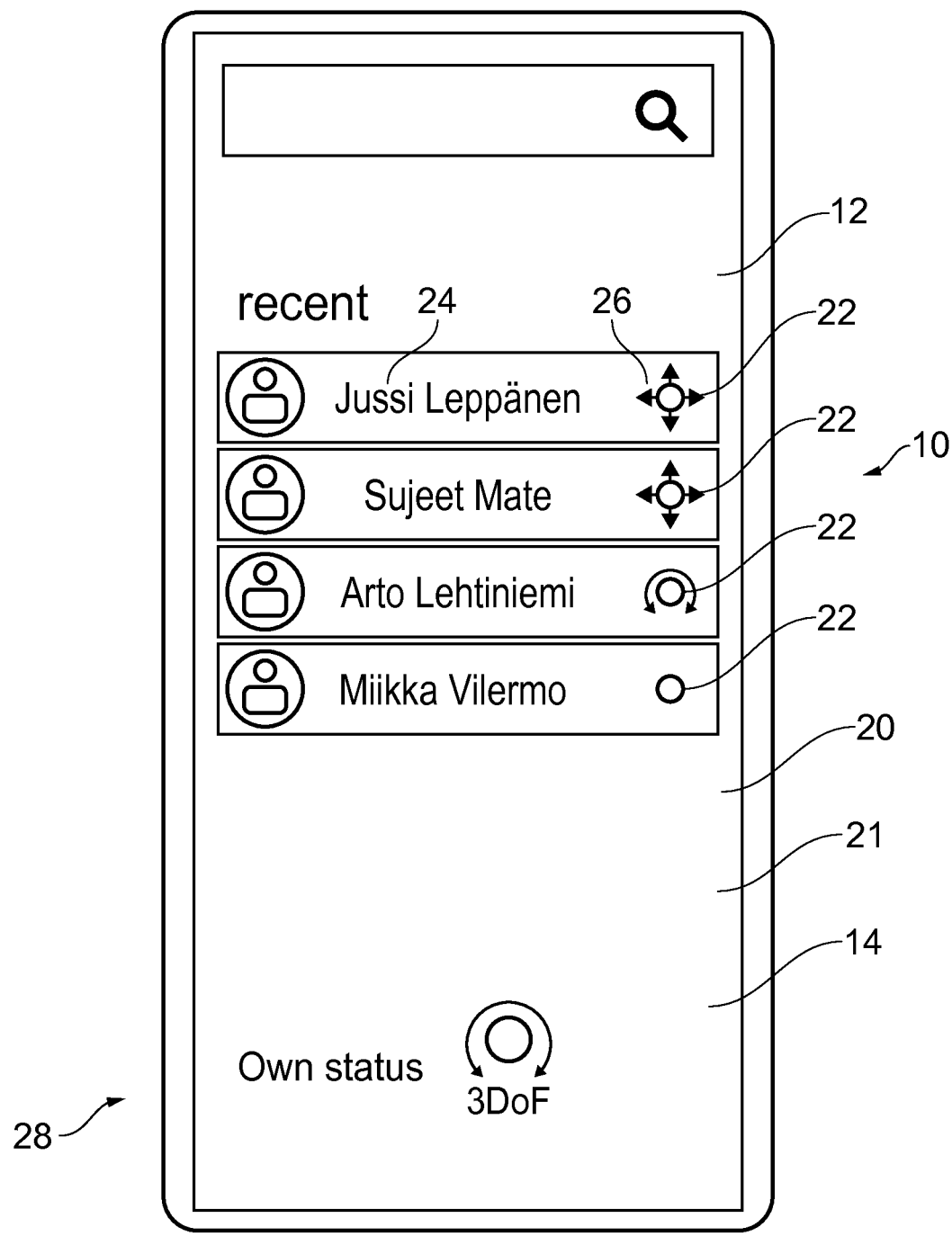
FIG. 1 shows an example embodiment of the subject matter described herein.

"artificial environment" may be something that has been recorded or generated.

"virtual visual space" refers to fully or partially artificial environment that may be viewed, which may be three dimensional.

"virtual visual scene" refers to a representation of the virtual visual space viewed from a particular point of view (position) within the virtual visual space.

'virtual visual object' is a visible virtual object within a virtual visual scene.

"sound space" (or "virtual sound space") refers to an arrangement of sound sources in a three-dimensional space. A sound space may be defined in relation to recording sounds (a recorded sound space) and in relation to rendering sounds (a rendered sound space).

"sound scene" (or "virtual sound scene") refers to a representation of the sound space listened to from a particular point of view (position) within the sound space.

"sound object" refers to sound source that may be located within the sound space. A source sound object represents a sound source within the sound space, in contrast to a sound source associated with an object in the virtual visual space. A recorded sound object represents sounds recorded at a particular microphone or location. A rendered sound object represents sounds rendered from a particular location.

"virtual space" may mean a virtual visual space, mean a sound space or mean a combination of a virtual visual space and corresponding sound space. In some examples, the virtual space may extend horizontally up to 360° and may extend vertically up to 180°.

"virtual scene" may mean a virtual visual scene, mean a sound scene or mean a combination of a virtual visual scene and corresponding sound scene.

'virtual object' is an object within a virtual scene, it may be an augmented virtual object (e.g. a computer-generated virtual object) or it may be an image of a real object in a real space that is live or recorded. It may be a sound object and/or a virtual visual object.

"Virtual position" is a position within a virtual space. It may be defined using a virtual location and/or a virtual orientation. It may be considered to be a movable 'point of view'.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound space and virtual visual space (or visual scene) are corresponding and a notional (virtual) listener whose point of view defines the sound scene and a notional (virtual) viewer whose point of view defines the virtual visual scene (or visual scene) are at the same location and orientation, that is they have the same point of view (same virtual position).

"real space" (or "physical space") refers to a real environment, which may be three dimensional.

"real scene" refers to a representation of the real space from a particular point of view (position) within the real space.

"real visual scene" refers to a visual representation of the real space viewed from a particular
real point of view (position) within the real space.

"mediated reality" in this document refers to a user experiencing, for example visually, a fully or partially artificial environment (a virtual space) as a virtual scene at least partially rendered by an apparatus to a user. The virtual scene is determined by a point of view (virtual position) within the virtual space. Displaying the virtual scene means providing a virtual visual scene in a form that can be perceived by the user.

"augmented reality" in this document refers to a form of mediated reality in which a user experiences a partially artificial environment (a virtual space) as a virtual scene comprising a real scene, for example a real visual scene, of a physical real environment (real space) supplemented by one or more visual or audio elements rendered by an apparatus to a user. The term augmented reality implies a mixed reality or hybrid reality and does not necessarily imply the degree of virtuality (vs reality) or the degree of mediality;

"virtual reality" in this document refers to a form of mediated reality in which a user experiences a fully artificial environment (a virtual visual space) as a virtual scene displayed by an apparatus to a user;

"virtual content" is content, additional to real content from a real scene, if any, that enables mediated reality by, for example, providing one or more augmented virtual objects.

"mediated reality content" is virtual content which enables a user to experience, for example visually, a fully or partially artificial environment (a virtual space) as a virtual scene. Mediated reality content could include interactive content such as a video game or non-interactive content such as motion video.

"augmented reality content" is a form of mediated reality content which enables a user to experience, for example visually, a partially artificial environment (a virtual space) as a virtual scene. Augmented reality content could include interactive content such as a video game or non-interactive content such as motion video.

"virtual reality content" is a form of mediated reality content which enables a user to experience, for example visually, a fully artificial environment (a virtual space) as a virtual scene. Virtual reality content could include interactive content such as a video game or non-interactive content such as motion video.

"perspective-mediated" as applied to mediated reality, augmented reality or virtual reality means that user actions determine the point of view (virtual position) within the virtual space, changing the virtual scene;

"first person perspective-mediated" as applied to mediated reality, augmented reality or virtual reality means perspective mediated with the additional constraint that the user's real point of view (location and/or orientation) determines the point of view (virtual position) within the virtual space of a virtual user, "third person perspective-mediated" as applied to mediated reality, augmented reality or virtual reality means perspective mediated with the additional constraint that the user's real point of view does not determine the point of view (virtual position) within the virtual space;

"user interactive" as applied to mediated reality, augmented reality or virtual reality means that user actions at least partially determine what happens within the virtual space;

"displaying" means providing in a form that is perceived visually (viewed) by the user.

"rendering" means providing in a form that is perceived by the user

"virtual user" defines the point of view (virtual position—location and/or orientation) in virtual space used to generate a perspective-mediated sound scene and/or visual scene. A virtual user may be a notional listener and/or a notional viewer.

"notional listener" defines the point of view (virtual position—location and/or orientation) in virtual space used to generate a perspective-mediated sound scene, irrespective of whether or not a user is actually listening "notional viewer" defines the point of view (virtual position—location and/or orientation) in virtual space used to generate a perspective-mediated visual scene, irrespective of whether or not a user is actually viewing.

Three degrees of freedom (3DoF) describes mediated reality where the virtual position is determined by orientation only (e.g. the three degrees of three-dimensional orientation). An example of three degrees of three-dimensional orientation is pitch, roll and yaw. In relation to first person perspective-mediated reality 3DoF, only the user's orientation determines the virtual position.

Six degrees of freedom (6DoF) describes mediated reality where the virtual position is determined by both orientation (e.g. the three degrees of three-dimensional orientation) and location (e.g. the three degrees of three-dimensional location). An example of three degrees of three-dimensional orientation is pitch, roll and yaw. An example of three degrees of three-dimensional location is a three-dimensional coordinate in a Euclidian space spanned by orthogonal axes such as left-to-right (x), front to back (y) and down to up (z) axes. In relation to first person perspective-mediated reality 6DoF, both the user's orientation and the user's location in the real space determine the virtual position.

In relation to third person perspective-mediated reality 6DoF, the user's location in the real space does not determine the virtual position. The user's orientation in the real space may or may not determine the virtual position.

Three degrees of freedom 'plus' (3DoF+) describes an example of six degrees of freedom where a change in location (e.g. the three degrees of three-dimensional location) is a change in location relative to the user that can arise from a postural change of a user's head and/or body and does not involve a translation of the user through real space by, for example, walking.

DETAILED DESCRIPTION

FIG. 1 illustrates an example of an apparatus 10 comprising a man machine interface (MMI) 20. The man machine interface 20 is configured to provide a screen 21 that presents information indicative 10 of, at least, a real-time capability of a remote user to access and consume mediated reality content. The man machine interface 20 is also configured to provide a user-selectable option 22 to initiate an action that causes the mediated reality content to become accessible to the remote user having previously been inaccessible.

In this example, the apparatus 10 comprises a display 12 that displays the screen 21. The screen 21 comprises a list of user-selectable widgets 22. Each widget comprises a remote user identifier 24 that identifies a remote user and a status indicator 26 that indicates the real-time capability of the remote user to access and consume mediated reality content. In his example, but not necessarily all examples, the remote user identifier is a text field (only) that includes the remote user's name. However other identifiers may be used such as monikers, pictures, icons etc.

In this example the status indicators 26 have one of three different statuses. A first status indicator 26, used for Jussi and Sujeet, indicates that Jussi and Sujeet have a real-time capability to access and consume mediated reality content using six degrees of freedom (6DoF). A second status indicator 26, used for Arto, indicates that Arto has a real-time capability to access and consume mediated reality content using three degrees of freedom plus (3DoF+). A third status indicator 26, used for Miikka, indicates that Miikka has a real-time capability to access and consume mediated reality content using three degrees of freedom (3DoF).

The user of the apparatus 10 is therefore able to discern from the man machine interface 20 the real-time capability of multiple remote users to access and consume mediated reality content.

Each of the user-selectable widgets 22 is an option, which, if selected, initiates an action that causes mediated reality content to become accessible to the remote user identified by the user identifier 24 of that widget 22.

The mediated reality content may be predefined content, or content that is defined by the user or by context. The mediated reality content may be pre-stored or may be captured live.

In this example, the man machine interface 20 also includes a user status indicator 28 for the user of the apparatus 10. In this example, the user status indicator 28 indicates the real-time capability of the local user to access and consume mediated reality content. In this example the user status indicators 28 can have one of statuses of the status indicator 26 for the remote user. In this example, the user status indicator 28 indicates a capability of the local user to capture mediated reality content. In other examples the indicator may alternatively or additionally indicate that the local user can provide mediated reality content and/or access and consume mediated reality content using three degrees of freedom.

FIGS. 2A, 3A, 4A, 2B, 3B, 4B illustrate first person perspective mediated reality. In this context, mediated reality means the rendering of mediated reality for the purposes of achieving mediated reality for a remote user, for example augmented reality or virtual reality. It may or may not be user interactive. The mediated reality may support 3DoF, 3DoF+ or 6DoF. Alternatively, the mediated reality may support 3DoF or 6DoF, not 3DoF+.

Figure 2A:
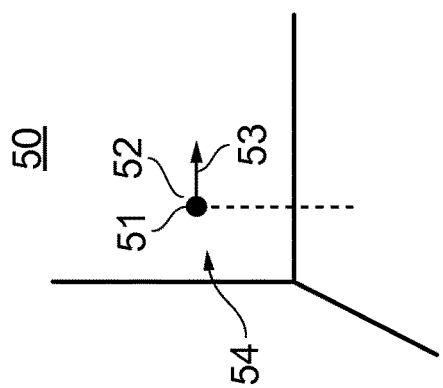
FIGS. 2A, 2B, 3A, 3B, 4A, 4B shows another example embodiment of the subject matter described herein.
Figure 3A:
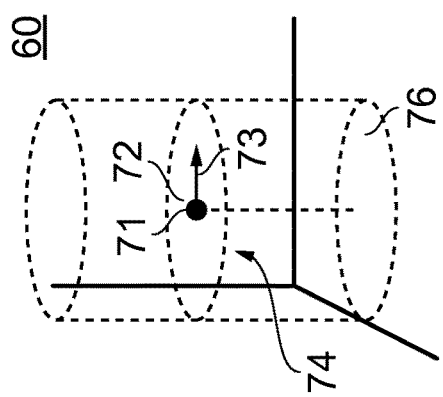
Figure 4A:
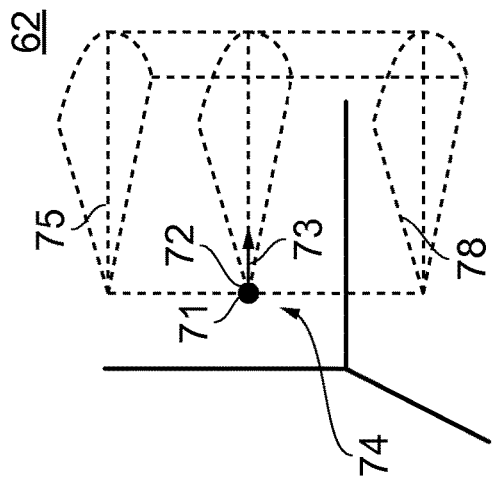

FIGS. 2A, 3A, 4A illustrate at a first time a real space 50, a sound space 60 and a visual space 62. There is correspondence between the sound space 60 and the virtual visual space 62. A user 51 in the real space 50 has a point of view (a position) 54 defined by a location 52 and an orientation 53. The location is a three-dimensional location and the orientation is a three-dimensional orientation.

In an example of 3DoF mediated reality, the user's real point of view 54 (orientation) determines the point of view 74 (virtual position) within the virtual space of a virtual user. An orientation 53 of the user 51 controls a virtual orientation 73 of a virtual user 71. There is a correspondence between the orientation 53 and the virtual orientation 73 such that a change in the orientation 53 produces the same change in the virtual orientation 73. The virtual orientation 73 of the virtual user 71 in combination with a virtual field of view 78 defines a virtual visual scene 75 within the virtual visual space 62. In some examples, it may also define a virtual sound scene 76. A virtual visual scene 75 is that part of the virtual visual space 62 that is displayed to a user. A virtual sound scene 76 is that part of the virtual sound space 60 that is rendered to a user. The virtual sound space 60 and the virtual visual space 62 correspond in that a position within the virtual sound space 60 has an equivalent position within the virtual visual space 62. In 3DoF mediated reality, a change in the location 52 of the user 51 does not change the virtual location 72 or virtual orientation 73 of the virtual user 71.

In the example of 6DoF mediated reality, the user's real point of view 54 (location and/or orientation) determines the point of view 74 (virtual position) within the virtual space of a virtual user 71. The situation is as described for 3DoF and in addition it is possible to change the rendered virtual sound scene 76 and the displayed virtual visual scene 75 by movement of a location 52 of the user 51. For example, there may be a mapping between the location 52 of the user 51 and the virtual location 72 of the virtual user 71. A change in the location 52 of the user 51 produces a corresponding change in the virtual location 72 of the virtual user 71. A change in the virtual location 72 of the virtual user 71 changes the rendered sound scene 76 and also changes the rendered visual scene 75.

Figure 2B:
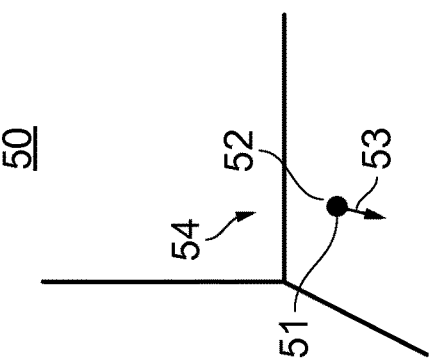
Figure 3B:
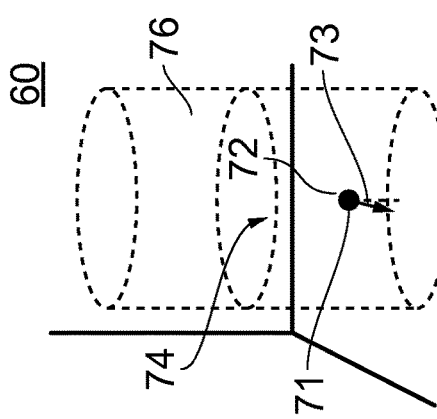
Figure 4B:
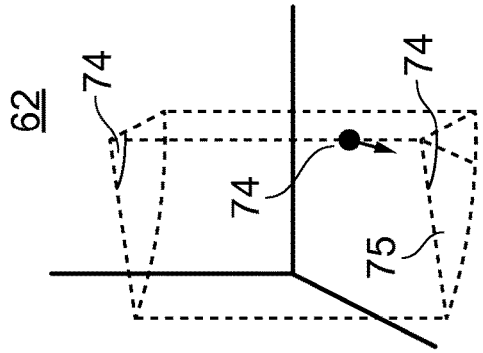

This may be appreciated from FIGS. 2B, 3B and 4B which illustrate the consequences of a change in location 52 and orientation 53 of the user 51 on respectively the rendered sound scene 76 (FIG. 3B) and the rendered visual scene 75 (FIG. 4B). The change in location may arise from a postural change of the user and/or a translation of the user by walking or otherwise.

Figure 5A:
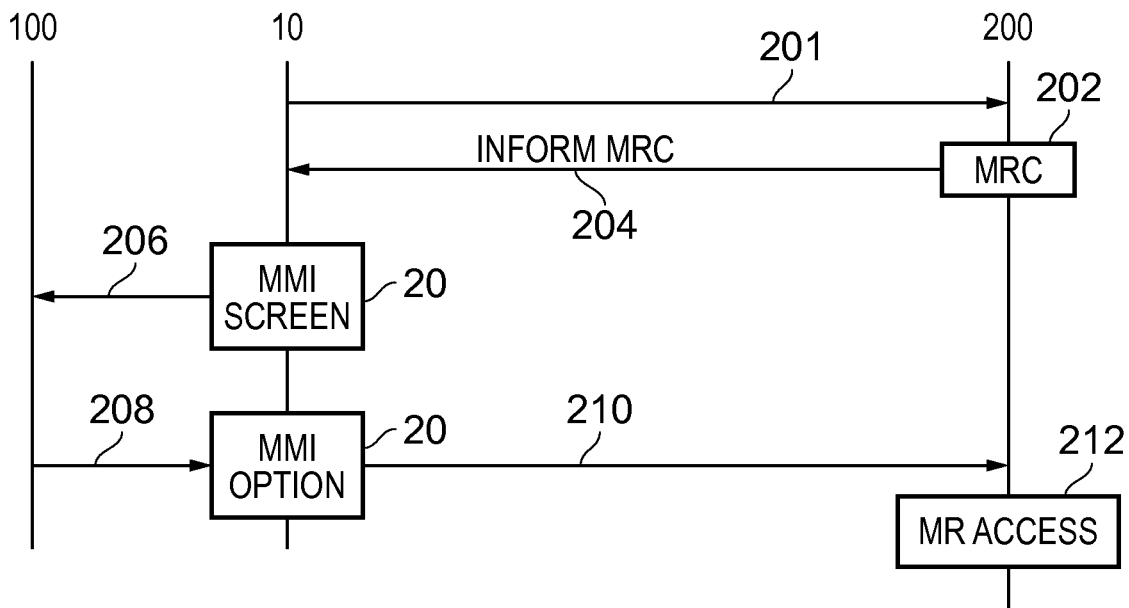
FIG. 5A shows an example embodiment of the subject matter described herein.

FIG. 5A illustrates an example of a method. The method comprises providing, via a man machine interface 20, a screen 21. The screen 21 informs a user 100 of the man machine interface 20 by presenting information indicative of, at least, a real-time capability of a remote user 200 to access and consume 212 mediated reality content. The method also comprises providing, via the man machine interface 20, a user-selectable option to initiate an action. The action causes the mediated reality content to become accessible to the remote user 200.

In this example, the capability 202 of a remote user 200 to access and consume mediated reality content is communicated 204 from the remote user 200 to the apparatus 10. The man machine interface 20 of the apparatus 10 provides a screen 21 that presents 206 information indicative of, at least, the real-time capability 202 of the remote user 200 to access and consume mediated reality content.

The man machine interface 20 provides a user-selectable option. If this user-selectable option is selected 208 by the user 100, an action is initiated that causes 210 the mediated reality content to become accessible 212 to the remote user 200.

Figure 5B:
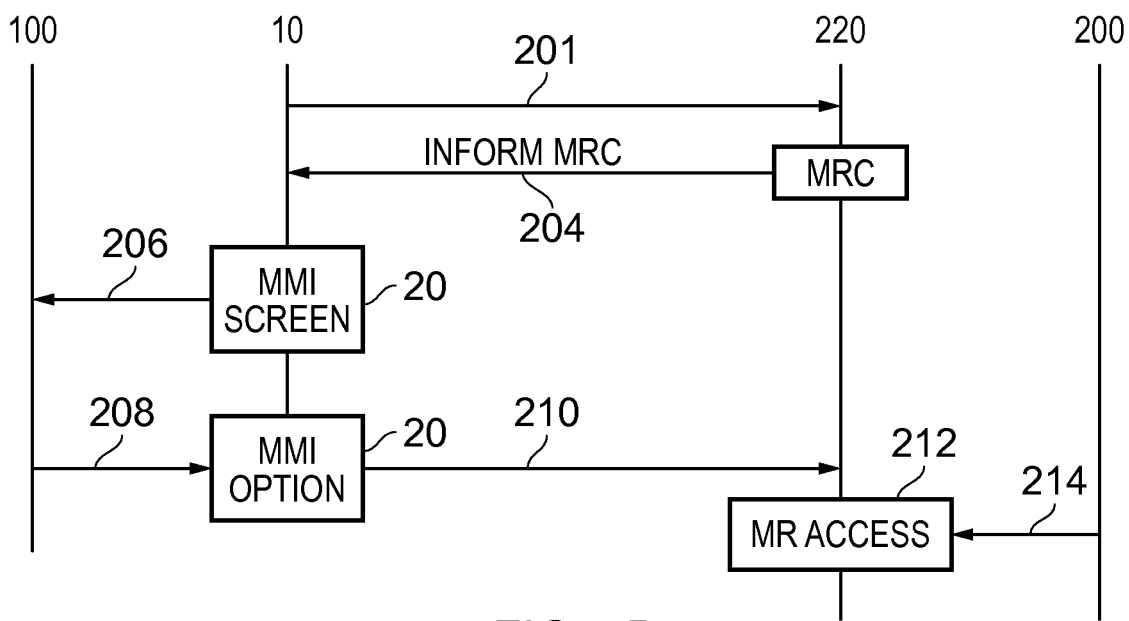
FIG. 5B shows another example embodiment of the subject matter described herein.

FIG. 5B illustrates the method illustrated in FIG. 5A but in addition illustrates an apparatus 220. The apparatus 220 is an apparatus that enables communication of the mediated reality content to the remote user 200. In the example illustrated the apparatus 200 is a remote apparatus used by the remote user 200.

The method comprises providing, via a man machine interface 20, a screen 21. The screen 21 presents information indicative of, at least, a real-time capability of a remote user 200 to access and consume 212 mediated reality content. The method also comprises providing, via the man machine interface 20, a user-selectable option to initiate an action. The action causes the mediated reality content to become accessible to the remote user 200.

In this example, the capability 202 of a remote user 200 to access and consume mediated reality content is communicated 204 from the remote apparatus 220 of the remote user 200 to the apparatus 10. The man machine interface 20 of the apparatus 10 provides a screen that presents 206 information indicative of, at least, the real-time capability 202 of the remote user 200 to access and consume mediated reality content.

The man machine interface 20 provides a user-selectable option. If this user-selectable option is selected 208 by the user 100, an action is initiated that causes 210 the mediated reality content to become accessible 212 to the remote user 200 via the remote apparatus 220.

In the examples of FIGS. 5A and 5B, but not necessarily all examples, the real-time capability of the remote user 200 is a capability to identify, as they happen, changes made by the remote user, in viewing direction of the remote user 200 and viewing location of the remote user, intended by the remote user 200 for controlling a point of view 74 of a virtual user 71 that defines what scene 75, 76 from the mediated reality content is rendered to the remote user 200.

The real-time capability 202 is constrained by a relationship of the remote user 200 to her surroundings. It may, for example, depend upon an ability of the remote user 200 to move enough to change location. This may, for example, relate to the ability of the remote user 200 to effect a posture change or a translational change in location or it may, for example, depend upon a size of a room in which the remote user 200 is located. The relationship of the remote user to the surroundings may also be dependent upon an ability to discriminate movement for controlling a point of view 74 of the virtual user 71 from other movement, for example continuous background movement such as that arising from the remote user being located in a vehicle or it may depend upon the capabilities of an apparatus 220 used by the remote user 200 (see FIG. 5B).

As previously described in relation to FIG. 1, the screen 21 of the man machine interface 20 is configured to present information indicative of, at least, a real-time capability of the remote user 200 to access and consume mediated reality content in a first mode or a second mode. In the example illustrated in FIG. 1, a status indicator 26 is for example used to indicate a real-time capability of the remote user to access and consume mediated reality content in a first mode (e.g. 3DoF) and to indicate a real-time capability of the remote user 200 to access and consume mediated reality content in a second mode (e.g. 6DoF). In the particular example illustrated in FIG. 1, the screen 21 of the man machine interface 20 is configured to present information indicative of a real-time capability of the remote user to access and consume mediated reality content in a third mode (3DoF+). As previously described, the third mode is a sub-mode of the second mode. The third mode is also optional. In future implementations there may be additional modes and/or sub-modes of the second mode, for example, where changes in location are restricted to less than three dimensions and, alternatively or additionally, changes in orientation are restricted to less than three dimensions. There could for example be a mode or sub-mode with limited movement capability, for example, along one axis or on a horizontal plane but not up nor down.

In the following description reference will be made to the first mode and the second mode for simplicity of description.

In the first mode (e.g. 3DoF), a point of view 74 of a virtual user 71 is dependent upon an orientation of a viewing direction of the remote user 200 and it is not dependent upon a change in viewing location of the remote user 200. In the second mode, the point of view of the virtual user 200 is dependent upon an orientation of a viewing direction of the remote user 200 and is also dependent upon a change in viewing location of the remote user. As previously described, the point of view 74 of the virtual user 71 controls which scene 76, 75 of mediated reality content is rendered to the remote user 200.

In the first mode, a viewing direction of the remote user 200 is mapped to a viewing direction of the virtual user 71 and, in the second mode, a viewing direction of the remote user 200 is mapped to a viewing direction of the virtual user 71 and a change in viewing location of the remote user 200 is mapped to a change in viewing location of the virtual user 71.

In one implementation, a viewing location of the remote user 200 is mapped to a viewing location of the virtual user 71. However, it is possible to have alternative implementations, for example where a viewing location of the remote user 200 is mapped to a rate of change in viewing location of the virtual user 71. This latter arrangement may, for example, be used where the real-time capability of the remote user 200 to walk within their environment is insufficient for the virtual user 71 to move within the virtual space. In such a situation a postural change of the remote user 200 may be used to cause a small change in location that controls a velocity of the virtual user 71 in the virtual space.

In other implementations, a viewing location of the virtual user 71 may be changed using a user input controller device such as a joystick, buttons, mouse etc The viewing direction of the remote user 200 may, for example, be determined by determining an orientation of the remote user 200 or by detecting a gaze direction of the remote user. A change in viewing location of the remote user 200 may be as a consequence of head movement, postural movement and/or full body movement for example by walking. In some examples, the remote user 200 may wear a head-mounted apparatus and the location and orientation of the head-mounted apparatus may be used as the location and orientation of the remote user 200 that is used to determine the location and orientation of the virtual user 71.

In some, but not necessarily all, examples, the mediated reality content may be selected by the user 100 of the apparatus 10. In some examples the mediated reality content may be live content recorded by the apparatus 10. In other examples, the mediated reality content may be stored mediated reality content that is stored at the apparatus 10 or at some remote server.

Figure 5C:
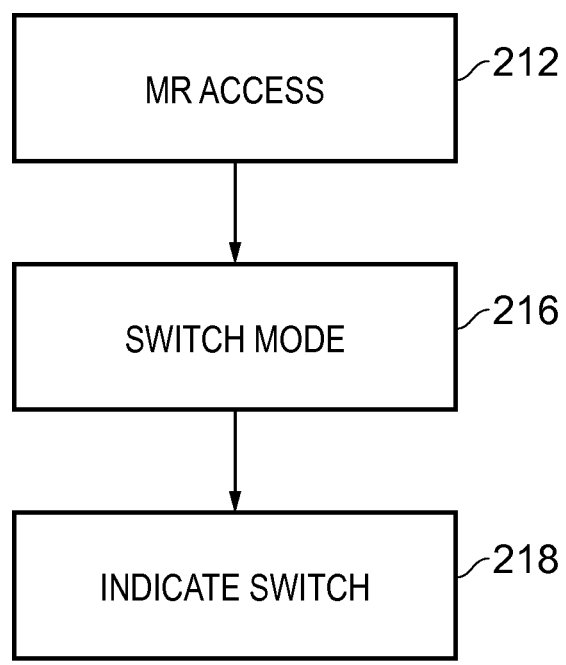
FIG. 5C shows an example embodiment of the subject matter described herein.

FIG. 5C illustrates an example of a method where movement of the remote user 200 is used to trigger a switch between the first mode and the second mode.

As previously described, at block 212, the method causes mediated reality content to become accessible to a remote user 200. A point of view 74 of a virtual user 71 controls which scene 75, 76 of mediated reality content is rendered to the remote user 200. In a first mode (3DoF), a point of view 74 of a virtual user 71 is dependent upon an orientation of a viewing direction 53 of the remote user 200 and is not dependent upon a change in viewing location 52 of the remote user 200. In a second mode, the point of view 74 of the virtual user 71 is dependent upon an orientation of a viewing direction 53 of the remote user 200 and is also dependent upon a change in viewing location 52 of the remote user 200.

In this example, the method additionally comprises controlling accessibility of mediated reality content to the remote user 200 by switching 216 between the first mode and the second mode in dependence upon movement of the remote user 200.

The method comprises, at block 212, causing mediated reality content to become accessible to a remote user 200 wherein a point of view 74 of a virtual user 71 controls which scene of mediated reality content is rendered to the remote user 200. In a first mode, a point of view 74 of a virtual user 71 is dependent upon an orientation of a viewing direction of the remote user 200 and is not dependent upon a change in viewing location of the remote user 200. In a second mode, the point of view 74 of the virtual user 71 is dependent upon an orientation of a viewing direction of the remote user 200 and is also dependent upon a change in viewing location of the remote user 200.

The method comprises at block 216 controlling accessibility of mediated reality content to the remote user by switching between the first mode and the second mode in dependence upon movement of the remote user.

In some, but not necessarily all, examples, the switch 216 between the first mode and the second mode is indicated, at block 218, to the remote user 200, for example, the switch between the first mode and the second mode may be indicated to the remote user using an audio indication. The audio indication may be an addition or modification of the audio of the mediated reality content, for example. The audio indication may be temporary lasting for 1 to 10 seconds, for example. The audio indication may vary a mix of audio that is being rendered by for example altering a mix between a direct channel and reverberant channel. The audio indication may vary the audio by adding a reverberant effect temporarily.

In some, but not necessarily all examples, the switch may occur as a consequence of comparing a movement parameter that is dependent upon movement of the remote user with a threshold. The threshold may be dependent upon spatial characteristics of the mediated reality content.

Referring back to FIGS. 5A, and 5B, in some but not necessarily all examples, the apparatus 10 is configured to provide spatial characteristics 201 of the mediated reality content for determining the real-time capability 202 of the remote user 200 to access and consume the mediated reality content.

In some examples, for example as illustrated in FIG. 5B, the apparatus 10 can be configured to provide the mediated reality content to the apparatus 220 used by the remote user 200. The provided mediated reality content may, for example, be recorded content or live content.

Figure 6:
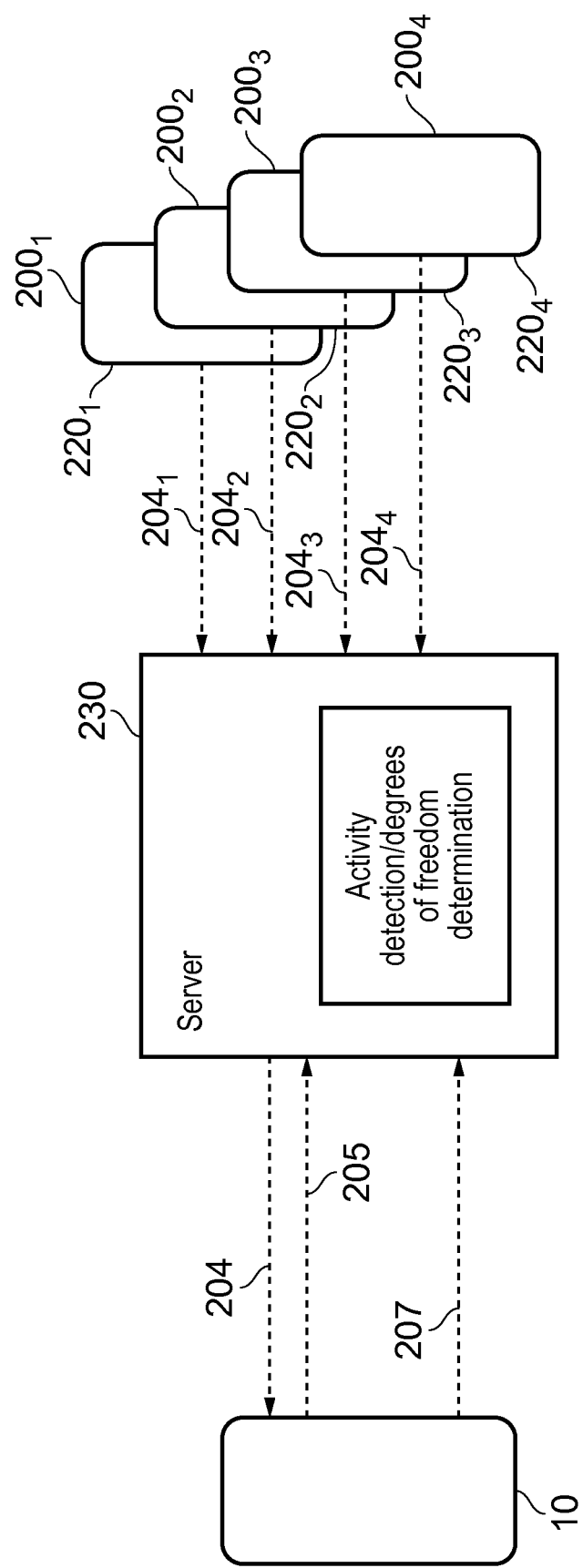
FIG. 6 shows another example embodiment of the subject matter described herein.

FIG. 6 illustrates an example in which a server 230 is used to provide a service for the user 100 of the apparatus 10 and the remote users 200 of remote apparatuses 220. In this example, and as illustrated in FIG. 1, the screen 21 of the man machine interface 20 is configured to present information indicative, for each of a plurality of remote users $200_n$, of a real-time capability of each of the plurality of remote users $200_n$ to access and consume mediated reality content and provide a user-selectable option 222 to initiate an action that causes the mediated reality content to become accessible to one or more of the plurality of remote users 200$_n$. As described in relation to FIG. 1, the user, by selecting a widget 22 can make a mediated reality content available to the remote user 200 identified by the user identifier 24 of that widget 22.

In the example illustrated in FIG. 6, the server 230 may control what mediated reality content is sent to which apparatus 10, 220 based upon the real-time capability of that apparatus to access and consume mediated reality content. The real-time capability 204 of each of the plurality of remote users 200 is therefore provided 204 to the server 230 and, if requested, onwards 204 to the apparatus 10. The real-time capability of the user 100 of the apparatus 10 is also provided 205 by the apparatus 10 to the server 230. The apparatus 10 also identifies 207 the mediated reality content to the server 230 or, if the apparatus 10 is going to provide the mediated reality content, it provides 207 spatial information for the mediated reality content.

FIGS. 7 to 11, illustrate different uses cases.

FIG. 7A is an example in which a local user 100 in a real space 50 is recording live mediated reality content including virtual objects 56. FIG. 7B illustrates the virtual space 60/62 of the virtual user 71 that controls the rendering of the mediated reality content to the remote user 200. FIG. 7C illustrates the consequence of the remote user 200 changing their point of view 74. In this example, the point of view is changed by the remote user 200 changing their location and also changing their orientation. As illustrated in this example, a change in the point of view of the remote user 200 causes an immediate change in the point of view 74 of the virtual user 71. The virtual scene rendered to the remote user 200 therefore changes. For example, the rendered virtual object 71 has changed location between FIGS. 7B and 7C from being on a right-hand side of the remote user 71 to being on a left-hand side of the remote user 200 and closer to the remote user and the rendered virtual object 76$_2$ has moved further away from the remote user 200. The remote user there has the experience of moving around the virtual space 60, 62 so that she can view and/or listen to the mediated reality content from different points of view (locations and directions). The remote user 200 experience 6DoF mediated reality.

Figure 8A:
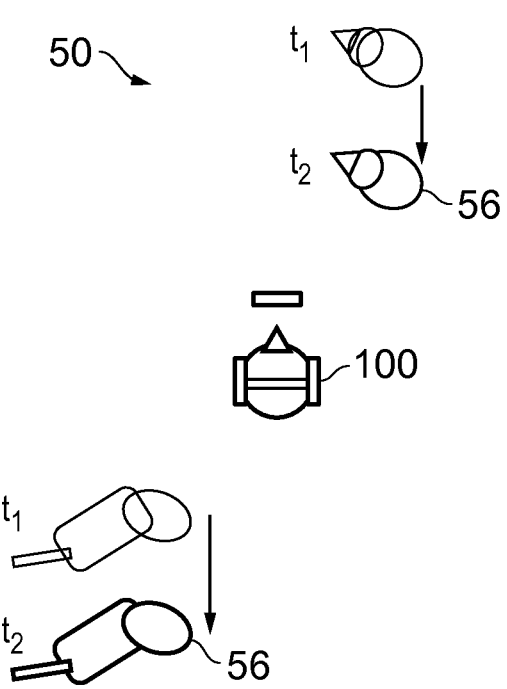
FIGS. 8A, 8B show another example embodiment of the subject matter described herein.
Figure 8B:
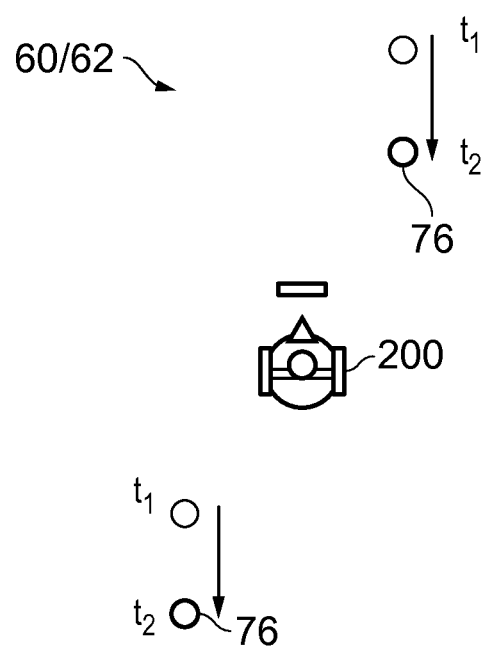

FIG. 8A is an example in which a local user 100 in a real space 50 is recording live mediated reality content including virtual objects 56. FIG. 8B illustrates the virtual space 60/62 of the virtual user 71 that controls the rendering of the mediated reality content to the remote user 200. In this example, the point of view 74 of the virtual user does not change but the positions of the virtual objects 56 change in the real space 50 and also in the virtual space 60/62 for the rendered virtual objects 76.

FIG. 9A is an example in which a local user 100 in a real space 50 is recording live mediated reality content including virtual objects 56. FIG. 9B illustrates the virtual space 60/62 of the virtual user 71 that controls the rendering of the mediated reality content to the remote user 200. In this example, the point of view 74 of the virtual user 71 that controls the mediated reality content rendered to the remote user 200 is controlled by a point of view of the user 100 rather than a point of view of the remote user 200.

FIG. 10A is an example in which a local user 100 in a real space 50 is recording live mediated reality content including virtual objects 56. FIG. 10B illustrates the virtual space 60/62 of the virtual user 71 that controls the rendering of the mediated reality content to the remote user 200. In this example, the point of view 74 of the virtual user 71 that controls the mediated reality content rendered to the remote user 200 is controlled by a point of view of the remote user 200 rather than a point of view of the local user 100. The location 72 of the point of view 74 of the virtual user 71 is fixed in space in this example, the location 72 of the virtual user does not change. A change in orientation 73 of the remote user 200 can cause a corresponding change in orientation of the virtual user 71. The movement of the user 100 does not change the position (location or orientation) of the virtual user 71.

The apparatus 10, used by the local user 100, is used to capture the objects 56 to produce the virtual objects 76 of the mediated reality content. A problem arises if the apparatus 10 moves too far from the objects 56, as illustrated in FIG. 10C. The apparatus 10, in FIG. 10C, is too far from the objects to reliably capture them.

It may therefore be desirable to interrupt live rendering of mediated reality content, when movement of the user 100 or apparatus 10 is undesirable, for example, if it exceeds a threshold value.

FIG. 11A is an example in which a local user 100 in a real space 50 is recording live mediated reality content including virtual objects 56. FIG. 11B illustrates the virtual space 60/62 of the virtual user 71 that controls the rendering of the mediated reality content to the remote user 200. In this example, the point of view 74 of the virtual user 71 that controls the mediated reality content rendered to the remote user 200 is controlled by a point of view of the remote user 200 rather than a point of view of the local user 100. The movement of the user 100 does not change the position (orientation and/or location) of the virtual user 71.

A change in location 72 of the remote user 200 causes a corresponding change in location 72 of the virtual user 71. A change in orientation 73 of the remote user 200 causes a corresponding change in orientation 73 of the virtual user 71.

A problem can arise if the remote user 200 moves too far, as illustrated in FIG. 11C. The virtual user 71, in FIG. 11C, is too far from the virtual objects 76 to reliably hear and/or see them.

It may therefore be desirable to interrupt live rendering of mediated reality content, when movement of the remote user 200 or apparatus 220 is undesirable, for example, if it exceeds a threshold value.

When the apparatus 10, used by the local user 100, is used to capture the objects 56 to produce the virtual objects 76 of the mediated reality content, then it may be difficult for a remote user to discriminate a change in the mediated reality arising from movement of the user 100/apparatus 10 (FIG. 9A, 9B) and movement of the objects 76 (FIG. 8A, 8B). In some but not necessarily all examples, it may be desirable to provide the remote user 200 with a cue to indicate movement of the user 100/apparatus 10. This may, for example, be achieved by modifying any rendered audio.

Referring to FIGS. 12A to 12E, the real-time capability 204 of a remote user 200 to access and consume mediated reality content is, in some but not necessarily all examples, determined, at least in part, by comparing a first movement parameter 262 that is dependent upon movement of the remote user 200 with a threshold 260. The movement parameter may for example record a change in position of the remote user 200. The change in position may, for example, be a change in location and/or a change in posture and/or a change in orientation.

The threshold 260 is dependent upon spatial characteristics of the mediated reality content. The spatial characteristics can, for example, indicate a size of a virtual space that can be moved in by the virtual user 71. The spatial characteristics may, for example, be defined by a size of a capture scene that is captured by the apparatus 10. This may, for example, be determined by a configuration of audio recording devices used by the apparatus 10 and the audio recording devices may be configured to provide information concerning their relative positions and ranges.

Figure 12A:
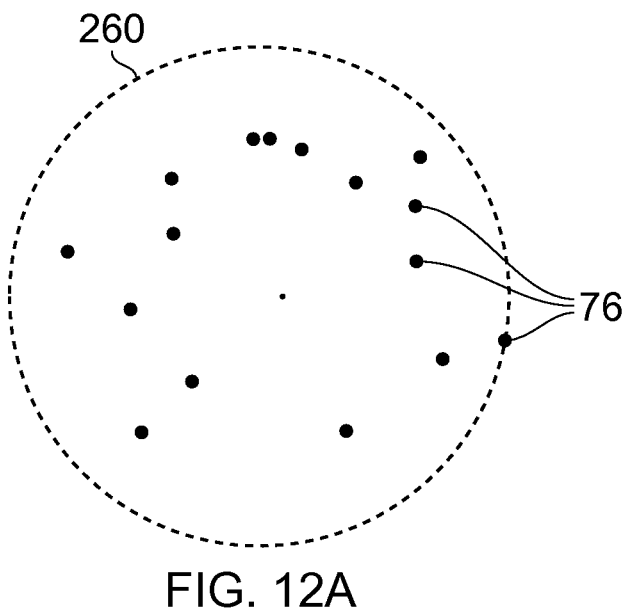
FIGS. 12A, 12B, 12C, 12D, 12E show another example embodiment of the subject matter described herein.

FIG. 12A schematically illustrates a threshold 260 that represents a minimum size requirement for rendering the mediated reality content in the second mode (6DoF). The spatial characteristics of the mediated reality content in this example is dependent upon a spatial distribution of virtual objects 76. This spatial distribution determines the threshold 260 which, in this example, is a sphere but can be other shapes.

Figure 12B:
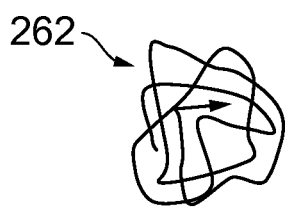

FIG. 12B illustrates a trajectory 262 of movement of the remote user 200 in the last N seconds.

Figure 12C:
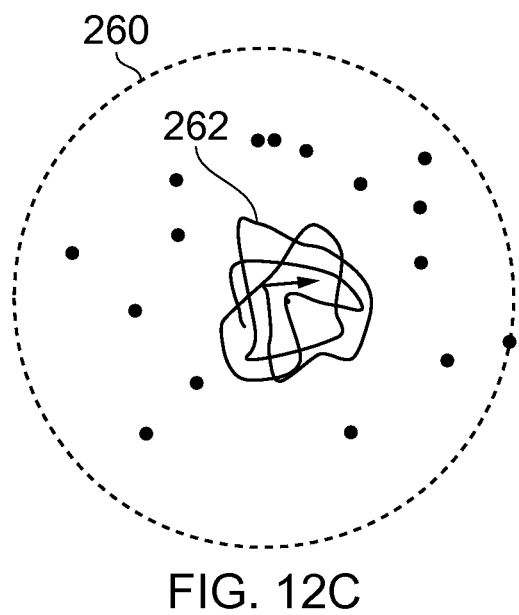

It can be seen from FIG. 12C that the trajectory 262 lies within the threshold 260. As the trajectory 262 lies within the threshold 260, the real-time capability 204 indicates that the remote user 200 has the capability to experience mediated reality content using the second mode (6DoF).

Figure 12D:

FIG. 12D illustrates an alternative trajectory 264 of the remote user 200. The trajectory 264 records the movement of the remote user 200 over the last N seconds.

Figure 12E:
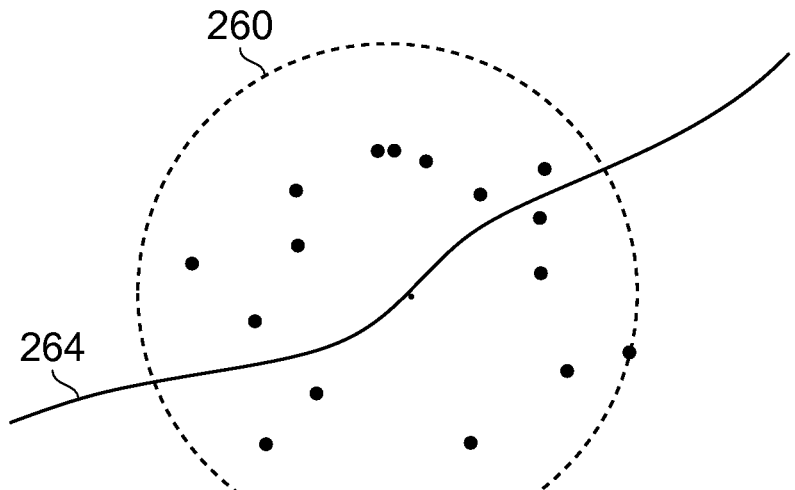

Referring to FIG. 12E, it can be seen that the trajectory 264 does not lie wholly within the threshold 260. It can therefore be determined that the real-time capability of the remote user 200 is that they can access and consume mediated reality content using only the first mode. That is they are capable of experiencing mediated reality content using 3DoF only and not using 6DoF.

Figure 13A:
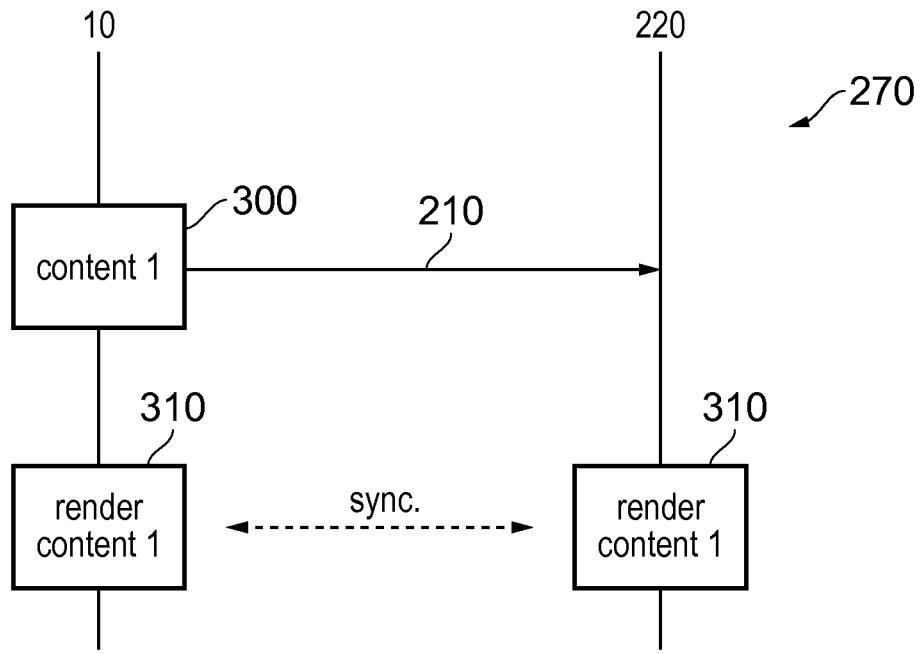
FIG. 13A shows an example embodiment of the subject matter described herein.

In some, but not necessarily all, examples, the user-selectable option 22 to initiate an action that causes the mediated reality content to become accessible to the remote user 200 is an option to initiate a live communication session 270 between the user 100 and the one or more remote users 200. In the example of FIG. 13A, first mediated reality content 300 is provided 210 by the apparatus 10 of the user 100 to the remote apparatus 220 of the remote user 200. The first mediated reality content 300 is rendered 310 simultaneously to both the user 100 via the apparatus 10 and the remote user 200 via the remote apparatus 220. A point of view of a first virtual user 71 controls in real time which scene of the first mediated reality content 200 is rendered 310 to the remote user 200, the point of view of the first virtual user being dependent upon an orientation of a viewing direction of the remote user 200 and, optionally, dependent upon a change in viewing location of the remote user. In this way, the user 100 and the remote user 200 share the same mediated reality content but do not necessarily share the same point of view within that mediated reality content. For example, a point of view of a second virtual user can control in real time which scene of the first mediated reality content 300 is rendered to the user 100, the point of view of the second virtual user being dependent upon an orientation of a viewing direction of the user 100 and, optionally, dependent upon a change in viewing location of the user 100.

The communication session 270 is live and the first mediated reality content rendered by the apparatus 10 is synchronized in time with the first mediated reality content rendered by the remote apparatus 220. When the first and second virtual users have the same point of view the user 100 and remotes user view mediated reality content that is not only temporally synchronous but also spatially synchronous.

Figure 13B:
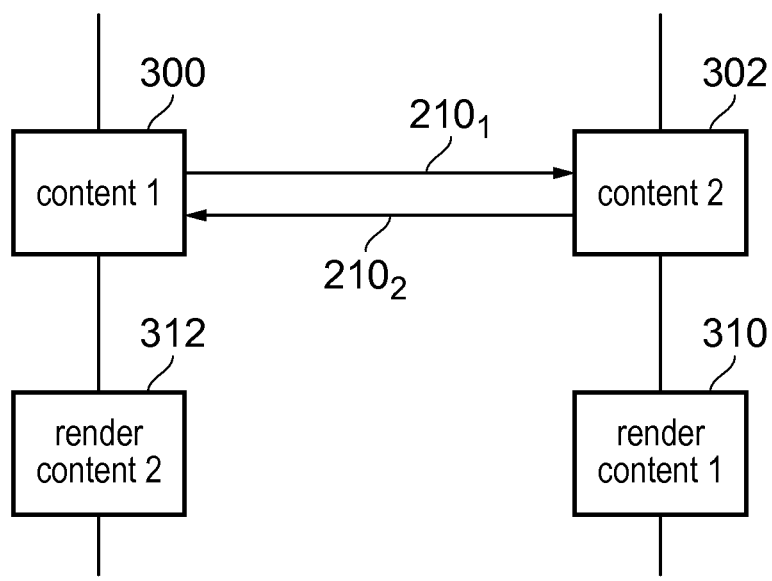
FIG. 13B shows another example embodiment of the subject matter described herein.

In the example of FIG. 13B, first mediated reality content 300 is provided $210_1$ by the apparatus 10 of the user 100 to the remote apparatus 220 of the remote user 200 and second mediated reality content 302 is provided $210_2$ by the remote apparatus 220 of the remote user 200 to the apparatus 10 of the user 100. In this example, the first mediated reality content and the second mediated reality content are provided simultaneously, that is live, to the user 100 and the remote user 200.

A point of view of a first virtual user controls in real time which scene of the first mediated reality content 300 is rendered 310 to the remote user 200 by the remote apparatus 220, the point of view of the first virtual user being dependent upon an orientation of a viewing direction of the remote user 200 and, optionally, dependent upon a change in viewing location of the remote user 200.

A point of view of a second virtual user controls in real time which scene of the second mediated reality content is rendered 312 to the user 100 by the apparatus 10, the point of view of the second virtual user being dependent upon an orientation of a viewing direction of the user 100 and, optionally, dependent upon a change in viewing location of the user 100.

The system illustrated in FIG. 13B may, for example, be used to provide a duplex conversation between the user 100 and the remote user 200. The user 100 and the remote user 200 therefore experience an immersive conversation in which the user 100 listens to audio produced by the remote user 200 in the context of the sound space that surrounds the remote user. The user 100 can use first perspective mediated reality to explore the sound space. Also the remote user 200 listens to audio produced by the user 100 in the context of the sound space that surrounds the user. The remote user 200 can use first perspective mediated reality to explore the sound space.

The apparatus 10 and/or the apparatus 220 used by the respective users may, for example, be a handheld personal device comprising a display 12 and configured as or housing the functionality previously described. The man machine interface 20 may be configured as part of an operating system of the apparatus 10 or it may be provided as a software module, for example a downloadable app, on the apparatus.

Figure 14A:
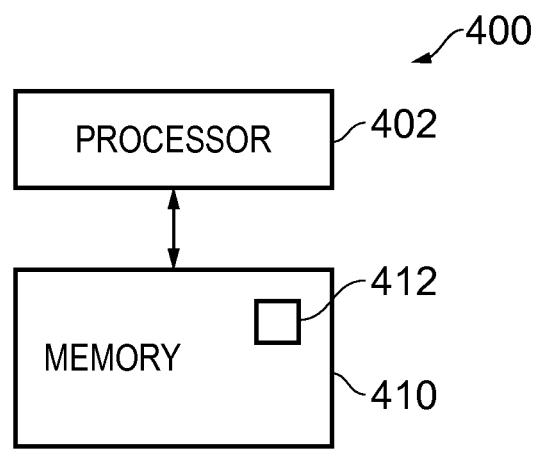
FIG. 14A shows an example embodiment of the subject matter described herein.
Figure 14B:
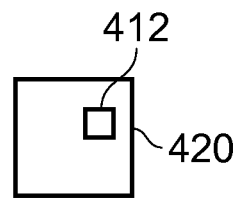
FIG. 14B shows another example embodiment of the subject matter described herein.

FIG. 14A illustrates an example of a controller 400. Implementation of a controller 400 may be as controller circuitry. The controller 400 may be implemented in hardware alone, have certain aspects in software including firmware alone or can be a combination of hardware and software (including firmware).

As illustrated in FIG. 14A the controller 400 may be implemented using instructions that enable hardware functionality, for example, by using executable instructions of a computer program 412 in a general-purpose or special-purpose processor 402 that may be stored on a computer readable storage medium (disk, memory etc) to be executed by such a processor 402.

The processor 402 is configured to read from and write to the memory 410. The processor 402 may also comprise an output interface via which data and/or commands are output by the processor 402 and an input interface via which data and/or commands are input to the processor 402.

The memory 410 stores a computer program 412 comprising computer program instructions (computer program code) that controls the operation of the apparatus 10 when loaded into the processor 402. The computer program instructions, of the computer program 412, provide the logic and routines that enables the apparatus to perform the methods illustrated in FIGS. 1 to 13. The processor 402 by reading the memory 410 is able to load and execute the computer program 412.

The apparatus 10 therefore comprises:
at least one processor 402; and
at least one memory 410 including computer program code
the at least one memory 410 and the computer program code configured to, with the at least one processor 402, cause the apparatus 10 at least to perform:
providing, via a man machine interface, a screen that presents information indicative of, at least, a real-time capability of a remote user to access and consume mediated reality content; and providing, via the man machine interface, a user-selectable option to initiate an action that causes the mediated reality content to become accessible to the remote user.

The apparatus 10 therefore comprises:
at least one processor 402; and
at least one memory 410 including computer program code
the at least one memory 410 and the computer program code configured to, with the at least one processor 402, cause the apparatus 10 at least to perform:
causing mediated reality content to become accessible to a remote user wherein a point of view of a virtual user controls which scene of mediated reality content is rendered to the remote user and wherein, in a first mode, a point of view of a virtual user is dependent upon an orientation of a viewing direction of the remote user and is not dependent upon a change in viewing location of the remote user and, in a second mode, the point of view of the virtual user is dependent upon an orientation of a viewing direction of the remote user and is also dependent upon a change in viewing location of the remote user; and controlling accessibility of mediated reality content to the remote user by switching between the first mode and the second mode in dependence upon movement of the remote user.

As illustrated in FIG. 14A, the computer program 412 may arrive at the apparatus 10 via any suitable delivery mechanism 420. The delivery mechanism 420 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 412. The delivery mechanism may be a signal configured to reliably transfer the computer program 412. The apparatus 10 may propagate or transmit the computer program 412 as a computer data signal.

In at least some examples, the computer program instructions are configured to cause an apparatus to perform at least the following: providing, via a man machine interface, a screen that presents information indicative of, at least, a real-time capability of a remote user to access and consume mediated reality content; and providing, via the man machine interface, a user-selectable option to initiate an action that causes the mediated reality content to become accessible to the remote user.

In at least some examples, the computer program instructions are configured to cause an apparatus to perform at least the following: causing mediated reality content to become accessible to a remote user wherein a point of view of a virtual user controls which scene of mediated reality content is rendered to the remote user and wherein, in a first mode, a point of view of a virtual user is dependent upon an orientation of a viewing direction of the remote user and is not dependent upon a change in viewing location of the remote user and, in a second mode, the point of view of the virtual user is dependent upon an orientation of a viewing direction of the remote user and is also dependent upon a change in viewing location of the remote user; and controlling accessibility of mediated reality content to the remote user by switching between the first mode and the second mode in dependence upon movement of the remote user.

The computer program instructions may be comprised in a computer program, a non-transitory computer readable medium, a computer program product, a machine readable medium. In some but not necessarily all examples, the computer program instructions may be distributed over more than one computer program.

Although the memory 410 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 1 to 13 may represent steps in a method and/or sections of code in the computer program 412. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising
at least one processor; and
at least one non-transitory memory including computer program code;
the at least one memory and the computer program code configured to, with the at least one processor, cause the apparatus at least to:
determine a real-time capability of a remote user to access and consume first person perspective-mediated reality content as a first person based, at least partially, on spatial characteristics of the first person perspective mediated reality content;
provide via a man machine interface, to a user, a screen that presents information indicative of, at least, the real-time capability of the remote user to access and consume the first person perspective-mediated reality content as the first person; and provide, via the man machine interface, to the user, a user-selectable option to initiate an action that causes the first person perspective-mediated reality content to become accessible to the remote user for consumption as the first person, wherein the real-time capability of the remote user is a capability to identify, as they happen, changes made by the remote user, in viewing direction of the remote user and viewing location of the remote user, for controlling a point of view of a virtual user that defines what scene from the first person perspective-mediated reality content is rendered to the remote user for consumption as the first person, wherein the screen of the man machine interface is configured to present the information indicative of, at least, the real-time capability of the remote user to access and consume the first person perspective-mediated reality content as the first person in a first mode or a second mode, wherein, in the first mode, the point of view of the virtual user is dependent upon an orientation of the viewing direction of the remote user and is not dependent upon a change in the viewing location of the remote user, wherein, in the second mode, the point of view of the virtual user is dependent upon the orientation of the viewing direction of the remote user and is also dependent upon the change in the viewing location of the remote user, wherein the point of view of the virtual user controls which scene of the first person perspective-mediated reality content is rendered to the remote user for consumption as the first person.

2. An apparatus as claimed in claim 1, wherein, in the first mode, the viewing direction of the remote user is mapped to a viewing direction of the virtual user, wherein, in the second mode, the viewing direction of the remote user is mapped to the viewing direction of the virtual user and the change in the viewing location of the remote user is mapped to a change in viewing location of the virtual user.

3. An apparatus as claimed in claim 1, wherein movement of the remote user is used to trigger a switch between the first mode and the second mode, and wherein a switch between the first mode and the second mode is indicated to the remote user.

4. An apparatus as claimed in claim 1, wherein the real-time capability of the remote user to access and consume first person perspective mediated reality content as the first person is determined, at least in part, based on comparing a first movement parameter that is dependent upon movement of the remote user with a threshold.

5. An apparatus as claimed in claim 4, wherein the threshold is dependent upon the spatial characteristics of the first person perspective-mediated reality content.

6. An apparatus as claimed in claim 1, wherein the at least one memory and the computer program code are further configured to, with the at least one processor, cause the apparatus to:

provide the spatial characteristics of the first person perspective-mediated reality content for determining the real-time capability of the remote user to access and consume the first person perspective-mediated reality content as the first person.

7. An apparatus as claimed in claim 6, wherein the at least one memory and the computer program code are further configured to, with the at least one processor, cause the apparatus to:

provide the first person perspective-mediated reality content to an apparatus used by the remote user.

8. An apparatus as claimed in claim 1, wherein the user-selectable option to initiate the action that causes the first person perspective-mediated reality content to become accessible to the remote user is an option to initiate a live communication session between the user and at least the remote user.

9. An apparatus as claimed in claim 8, wherein the at least one memory and the computer program code are further configured to, with the at least one processor, cause the apparatus to:

transmit the first person perspective-mediated reality content provided from the user to the remote user live; and receive, simultaneously, second first person perspective-mediated reality content provided from the remote user to the user live, wherein the point of view of the virtual user controls in real time which scene of the first person perspective-mediated reality content is rendered to the remote user for consumption as the first person, the point of view of the virtual user being dependent upon at least one of: the orientation of the viewing direction of the remote user or the change in viewing location of the remote user, wherein a point of view of a second virtual user controls in real time which scene of the second first person perspective-mediated reality content is rendered to the user for consumption as the first person, the point of view of the second virtual user being dependent upon at least one of: an orientation of a viewing direction of the user or a change in viewing location of the user.

10. An apparatus as claimed in claim 1, wherein the screen of the man machine interface is configured to present information indicative, for respective ones of a plurality of remote users, a real-time capability to access and consume the first person perspective-mediated reality content as the first person; and provide a user-selectable option to initiate an action that causes the first person perspective-mediated reality content to become accessible to one or more of the plurality of remote users for consumption as the first person.

11. A method comprising:

determining a real-time capability of a remote user to access and consume first person perspective-mediated reality content as a first person based, at least partially, on spatial characteristics of the first person perspective mediated reality content;

providing via a man machine interface, to a user, a screen that presents information indicative of, at least, the real-time capability of the remote user to access and consume the first person perspective-mediated reality content as the first person; and providing, via the man machine interface, to the user, a user-selectable option to initiate an action that causes the first person perspective-mediated reality content to become accessible to the remote user for consumption as the first person, wherein the real-time capability of the remote user is a capability to identify, as they happen, changes made by the remote user, in viewing direction of the remote user and viewing location of the remote user, for controlling a point of view of a virtual user that defines what scene from the first person perspective-mediated reality content is rendered to the remote user for consumption as the first person, wherein the screen of the man machine interface is configured to present information indicative of, at least, the real-time capability of the remote user to access and consume the first person perspective-mediated reality content as the first person in a first mode or a second mode, wherein, in the first mode, the point of view of the virtual user is dependent upon an orientation of the viewing direction of the remote user and is not dependent upon a change in the viewing location of the remote user, wherein, in the second mode, the point of view of the virtual user is dependent upon the orientation of the viewing direction of the remote user and is also dependent upon the change in the viewing location of the remote user, wherein the point of view of the virtual user controls which scene of first person perspective-mediated reality content is rendered to the remote user for consumption as the first person.

12. A method as claimed in claim 11 comprising:

wherein, in the first mode, the viewing direction of the remote user is mapped to a viewing direction of the virtual user, wherein, in the second mode, the viewing direction of the remote user is mapped to the viewing direction of the virtual user and the change in the viewing location of the remote user is mapped to a change in viewing location of the virtual user.

13. A method as claimed in claim 11, wherein movement of the remote user is used to trigger a switch between the first mode and the second mode, and wherein a switch between the first mode and the second mode is indicated to the remote user.

14. A method as claimed in claim 11, wherein the real-time capability of the remote user to access and consume first person perspective mediated reality content as the first person is determined, at least in part, based on comparing a first movement parameter that is dependent upon movement of the remote user with a threshold.

15. A method as claimed in claim 14, wherein the threshold is dependent upon the spatial characteristics of the first person perspective-mediated reality content.

16. A method as claimed in claim 11, comprising:

providing the spatial characteristics of the first person perspective-mediated reality content for determining the real-time capability of the remote user to access and consume the first person perspective-mediated reality content as the first person.

17. A method as claimed in claim 16, comprising:

providing the first person perspective-mediated reality content to an apparatus used by the remote user.

18. A method as claimed in claim 11, wherein the user-selectable option to initiate the action that causes the first person perspective-mediated reality content to become accessible to the remote user is an option to initiate a live communication session between the user and at least the remote user.

19. A method as claimed in claim 18, comprising:

transmitting the first person perspective-mediated reality content provided by the user to the remote user live; and receiving, simultaneously, second first person perspective-mediated reality content provided from the remote user to the user live, wherein the point of view of the virtual user controls in real time which scene of the first person perspective-mediated reality content is rendered to the remote user for consumption as the first person, the point of view of the virtual user being dependent upon at least one of: the orientation of a viewing direction of the remote user or the change in the viewing location of the remote user, wherein a point of view of a second virtual user controls in real time which scene of the second first person perspective-mediated reality content is rendered to the user for consumption as the first person, the point of view of the second virtual user being dependent upon at least one of: an orientation of a viewing direction of the user or a change in viewing location of the user.

20. A non-transitory computer readable medium comprising program instructions stored thereon for performing at least the following:

determining a real-time capability of a remote user to access and consume first person perspective-mediated reality content as a first person based, at least partially, on spatial characteristics of the first person perspective mediated reality content;

providing via a man machine interface, to a user, a screen that presents information indicative of, at least, the real-time capability of the remote user to access and consume the first person perspective-mediated reality content as the first person; and providing, via the man machine interface, to the user, a user-selectable option to initiate an action that causes the first person perspective-mediated reality content to become accessible to the remote user for consumption as the first person, wherein the real-time capability of the remote user is a capability to identify, as they happen, changes made by the remote user, in viewing direction of the remote user and viewing location of the remote user, for controlling a point of view of a virtual user that defines what scene from the first person perspective-mediated reality content is rendered to the remote user for consumption as the first person, wherein the screen of the man machine interface is configured to present information indicative of, at least, the real-time capability of the remote user to access and consume the first person perspective-mediated reality content as the first person in a first mode or a second mode, wherein, in the first mode, the point of view of the virtual user is dependent upon an orientation of the viewing direction of the remote user and is not dependent upon a change in the viewing location of the remote user, wherein, in the second mode, the point of view of the virtual user is dependent upon the orientation of the viewing direction of the remote user and is also dependent upon the change in the viewing location of the remote user, wherein the point of view of the virtual user controls which scene of the first person perspective-mediated reality content is rendered to the remote user for consumption as the first person.

* * * * *